United States Patent [19]

Dent

[11] Patent Number: 4,476,566

[45] Date of Patent: Oct. 9, 1984

[54] FREQUENCY HOPPING RADIO COMMUNICATIONS APPARATUS HAVING PSEUDO-RANDOM CHANNEL SELECTION

[75] Inventor: Paul W. Dent, Hampshire, England

[73] Assignee: The Marconi Company Limited, England

[21] Appl. No.: 386,296

[22] Filed: Jun. 8, 1982

[30] Foreign Application Priority Data

Jun. 19, 1981 [GB] United Kingdom ................. 8118954

[51] Int. Cl.³ ............................ H04B 7/12; H04J 6/00

[52] U.S. Cl. .......................................... 375/1; 375/2.2; 370/93

[58] Field of Search ...................... 375/1, 2, 57, 58, 40, 375/115; 455/26, 27, 29; 178/22, 37; 358/114, 121; 370/93

[56] References Cited

U.S. PATENT DOCUMENTS 4,271,524 6/1981 Goodman et al. ...................... 375/1
4,320,514 3/1982 Haskell ................................. 375/58
4,355,399 10/1982 Timor .................................... 375/1
4,383,323 5/1983 Timor .................................... 375/1
4,392,231 7/1983 Henry .................................... 375/1

*Primary Examiner*—Robert L. Griffin
*Assistant Examiner*—Stephen Chin
*Attorney, Agent, or Firm*—Kirschstein, Kirschstein, Ottinger & Israel

[57] ABSTRACT

Channel selection in a frequency hopping radio set is controlled by a pseudo-random number generator, the pseudo-random number being used to address an N bit memory (3) which is used to identify each of n available channels from N equipped channels. When a preselected number of the n channels have been identified by the psuedo-random number generator a latch (4) is enabled to store the channel number for selection purposes. Various scrambling methods are employed so that the channels on which one network of radio sets is operating is not readily identifiable from the channels on which another network of radio sets is operating.

9 Claims, 2 Drawing Figures

FREQUENCY HOPPING RADIO COMMUNICATIONS APPARATUS HAVING PSEUDO-RANDOM CHANNEL SELECTION

BACKGROUND OF THE INVENTION

The present invention relates to radio communications apparatus and in particular to such apparatus for use in communications networks of the kind hereinafter defined as frequency hopping radio communications networks.

DESCRIPTION OF THE PRIOR ART

One technique of overcoming deliberately introduced radio interference signals in a radio communication network is to change the frequency on which the transmitters and receivers operate at periodic intervals. When the periodic intervals are of the order of milliseconds and the change of frequency of the respective transmitters and receivers is carried out in synchronism and without operator action, the technique provides some immunity to deliberately introduced radio signals (sometimes known as "jamming") and provides some confidentiality to the transmissions. This method of operation is referred to herein as frequency hopping.

Taking as a typical example a radio set operating at frequencies in the VHF band of the electro-magnetic spectrum, the radio set will be arranged to operate in channels having twelve and one-half, twenty-five or fifty kilohertz spacing. When frequency hopping techniques are used many such channels are provided and the radio set is retuned as required being stepped to the respective frequency of each channel in turn.

Hitherto the maximum number of channels to which a radio set may be returned has been limited by a requirement for a large number of data bits to be held in a store for each channel.

It will be appreciated that the larger the number of channels to which the radio set may be retuned in frequency hopping, the more secure the system becomes.

If a number of channels are allocated to only one frequency hopping radio communication link then correspondingly less individual communication links may be provided. However, if a number of radio sets are provided each hopping between the same channels then either the radio sets will interfere with each others signals if the sets are hopping in a pseudo-random fashion or it will be possible to determine the frequencies of each radio set from observation of one of the radio sets if a sequential hopping method is adopted. These latter two problems are accentuated as the number of radio sets in use approaches the number of channels to which those radio sets are hopping.

It is one object of the present invention to provide improvements in frequency hopping radio communications networks and apparatus which substantially overcome the problems of utilising n radio sets on N frequency channels and of increasing the value of n with respect to systems previously known.

SUMMARY OF THE INVENTION

According to the present invention frequency hopping radio communications apparatus having selection circuitry for providing in pseudo-random order a sequence of multi-digit signals identifying n channels selected from N possible channels comprises a first counter responsive to clock signals to provide a series of multi-digit signals identifying each of the N possible channels, latching means the input of which receives the multi-digit signals from the first counter and which is arranged to provide a multi-digit signal at its output corresponding to the multi-digit signal present at its input each time the latching means is enabled, a store which is addressed by the multi-digit signals from the first counter and which is arranged to provide an enabling signal whenever the multi-digit signals from the first counter identify one of the n channels, and a second counter which is responsive to the enabling signals from the store to count the clock pulses supplied to the first counter and which is arranged on reaching a pre-determined value of the count to provide an enabling signal to the latching means to latch its output to the multi-digit signal then present at its input.

Preferably said stores a set of N data bits each of which represents a respective one of the N channels and the respective data bits representing each of the n channels are set to one binary value and the respective data bits representing each of the other channels are set to the other binary value.

The second counter may be presettable in response to multi-digit signals supplied thereto and the multi-digit signals may be derived from a pseudo-random number generator such that the sequence of signals provided at the output of the latching means may be varied.

In one described embodiment of the invention a counting order scrambler is provided at the output of the first counter such that the multi-digit signals supplied to the input of the latching means and used for addressing the store are not provided in a sequential order. The counting order scrambler may have a further input to which control signals may be applied to cause different scrambling orders to be provided.

The second counter may be provided with an input for providing a fixed offset value to be added to the presettable value such that a number of communications apparatuses employing respective selection circuitry and synchronised to change channels substantially in synchronism with each other each change to a respective channel in dependence upon the same presettable value modified by the respective offset value.

BRIEF DESCRIPTION OF THE INVENTION

Apparatus in accordance with the present invention will now be described with reference to the accompanying drawings of which FIG. 1 shows schematically a channel selector for use in a frequency hopping radio communication set, and FIG. 2 shows schematically an alternative channel selector for use in a frequency hopping radio communication set.

DESCRIPTION OF THE PREFERRED EMBODIMENT

Figure 1:
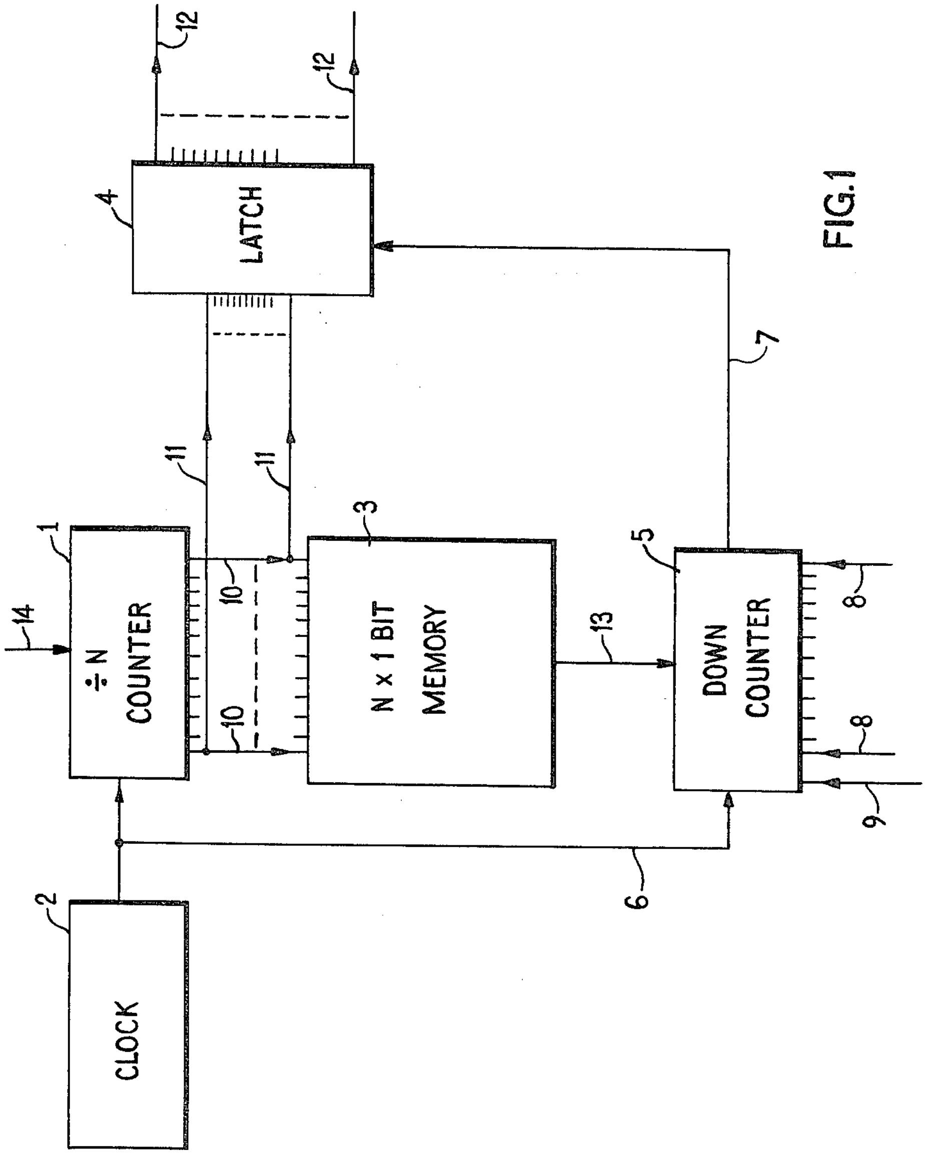

Referring to FIG. 1 the channel selector comprises a counter 1 arranged to count clock pulses from a clock source 2 and to provide addressing signals in the range 1–N by way of leads 10 to an N bit memory 3. The addressing signals from the counter 1 are also supplied by way of leads 11 to a latch circuit 4.

The memory 3 stores one data bit for each of N channels on which the radio apparatus is capable of operating. In a specific example radio apparatus arranged to operate in the VHF band in the frequency range of 30 megahertz to 88 megahertz 2320 channels of 25 kilohertz each may be specified. Thus the counter 1 is arranged to count from one to 2320 cyclically to provide cyclically to the memory 3 and the latch 4 the channel identities of the 2320 channels on which the set may operate.

In the memory 3 the respective data bits stored for each channel will be set to binary 'one' if the channel is available to the apparatus and to binary 'zero' if the channel is unavailable.

The channels which are available to the apparatus will be referred to hereinafter as a "hop set".

A hop set may comprise any number of pre-determined ones of the channels on which the apparatus is capable of operating. The radio apparatus may include several memories 3 each specifying the channels of a different hop set so that use of the apparatus is not confined to a particular hopset. Alternatively data relating to a number of hop sets (typically 6 to 10 hop sets) may be specified in the memory 3 by deriving the least significant bits of the addressing from the counter 1 in the manner hereinafter described and setting the most significant bits to identify the particular hop set being used.

In use addressing of the memory 3 by the counter 1 causes the respective bits relating to each channel to be read from the memory 3 by way of a lead 13 to enable a counter 5 to count clock pulses supplied from the clock 2 by way of a lead 6 for each available channel. The counter 5 is presettable to any number less than or equal to the number of channels available by way of leads 8 which may be connected to a pseudo-random generator (not shown).

When the counter 5 has counted the preset number of clock pulses from the clock 2 it is arranged to provide a signal by way of a lead 7 to the latch 4 which causes the latch 4 to store the multi-digit signal then present at its input from the counter 1. The latch 4 provides signals characterising the multi-digit signal on output leads 12 until it is enabled by a further signal from the counter 5.

Thus in use in a radio network several radio sets will be arranged to work with the same hop set and to change channels in synchronism with each other. The respective pseudo-random number generators (not shown) of each set must also be synchronised with each other so that once each of the radio sets are arranged to operate with each other, each set switches to the same channel at the same time.

In use, the output signals from the latch circuit 4 are supplied to frequency determining circuits of the radio set (not shown) for example frequency synthesisers. At pre-determined intervals a signal is supplied on a lead 9 to cause the counter 5 to preset to the number then present on the leads 8 from the pseudo-random number generator (not shown). This signal may also be supplied by way of a lead 14 to reset the counter 1 to its respective starting number. The counter 1 now counts the clock pulses from the clock 2 from 0 to 2320 supplying addressing signals to the memory 3. The memory 3 outputs the respective bits for each address to the counter 5 which thus counts from its preset number each available channel which has been passed. When the preset number of available channels has been passed the counter 5 enables the latch 4 to store the channel number then present at the output of the counter 1. When the period between hops is completed the signals on the leads 12 representing the next channel to be selected are gated to the channel determining circuits (not shown).

The counter 5 may be arranged to be preset to a number greater than the number of available channels in which case the counter 1 counts to 2320 and then recommences addressing of the memory 3. Thus several passes through the data stored may be required before the latch 4 is enabled by the counter 1.

For the purposes of example only assume that the network of radio sets are working together each set being capable of operating on any one of 2320 channels numbered 1 to 2320 and working with a hop set comprising channels 7, 13, 46, 57, 128, 909, 1327 and 2319. If the pseudo-random number generator causes the counter 5 to set to, say, four and the counter 1 commences at 0 then for addresses 0 to 6 the counter 5 is disabled. At address 7 the counter 1 is enabled by the memory and decrements to three. At addresses 8 to 12 the counter 5 is again disabled until at address 13 the counter 5 decrements to two. At addresses 14 to 45 the counter 5 is disabled and at address 46 decrements to 1. At address 57 the counter 5 decrements to zero causing an overflow signal on the lead 7 which enables the latch 4 to latch to the channel number 57. When the channel changeover (a hop) is due the channel number causes the frequency determining circuits (not shown) to switch to channel 57.

If the pseudo-random number generator (not shown) now causes the counter 5 to set to, say, seven channel number 1327 will be selected in a similar manner.

The process thus far described enables a given random-number sequence to be converted to a series of allowed channel frequencies.

In order to maximise the use of the channels in a hop set it is desirable for more than one channel in the hop set to be in use at any one time. This may be accomplished by arranging for several networks of radio sets using the same hop set to change channels at the same time as each other, arranging that no two networks select the same channel at the same time. Providing that the number of networks is less than to equal to the number of channels in the hop set the synchronised changeover to different channels is modified by the addition of an orthogonal offset value to the value provided to the counter 5 by the pseudo-random number generator (not shown).

Using the same hopset as that in the previous example namely a hop set comprising channels 7, 13, 46, 57, 128, 909, 1327 and 2319 and assume eight networks (referred to respectively herein as networks A, B, C, D, E, F, G and H) each network comprising a plurality of radio sets, each radio set capable of operation on any one of 2320 channels numbered respectively 1 to 2320 and a pseudo-random number sequence to the counter 5 of, say, 7, 5, 8, 1, 4, 3, 6, 2. The offset value for network A is 0, for network B is 1, for network C is 2 and so on to network H which has an offset value of 7. The operation of the counter 1, memory 3, counter 5 and latch 4 in each radio set will be the same as that previously described and the order of channel selection will be in accordance with the following table:

| Hop No. | Random No. | Channels selected by sets in Network: A | B | C | D | E | F | G | H |
|---|---|---|---|---|---|---|---|---|---|
| 1 | 7 | 1327 | 2319 | 7 | 13 | 46 | 57 | 128 | 909 |
| 2 | 5 | 128 | 909 | 1327 | 2319 | 7 | 13 | 46 | 57 |
| 3 | 8 | 2319 | 7 | 13 | 46 | 57 | 128 | 909 | 1327 |
| 4 | 1 | 7 | 13 | 46 | 57 | 128 | 909 | 1327 | 2319 |
| 5 | 4 | 57 | 128 | 909 | 1327 | 2319 | 7 | 13 | 46 |
| 6 | 3 | 46 | 57 | 128 | 909 | 1327 | 2319 | 7 | 13 |
| 7 | 6 | 909 | 1327 | 2319 | 7 | 13 | 46 | 57 | 128 |

-continued

| Hop No. | Random No. | Channels selected by sets in Network: A | B | C | D | E | F | G | H |
|---|---|---|---|---|---|---|---|---|---|
| 8 | 2 | 13 | 46 | 57 | 128 | 909 | 1327 | 2319 | 7 |

Thus considering radio sets in network A the channel changes are in the order 1327, 128, 2319, 7, 57, 46, 909, 13 whilst radio sets in network B change channels in the order 2319, 909, 7, 13, 128, 57, 1327, 46 due to the orthogonal offset value of one added to the preset value of the counter 5. Therefore there is no obvious relationship between the channel selected by a radio set in one hop and the channel selected by a radio set in a subsequent hop.

However there is a detectable relationship between the channels selected by the respective networks and that is that, for example, network B is always one allowed channel apart from network A. If the allowed channels in hop set are adjacent in the 0 to 2320 sequence then a simple frequency offset exists between any two networks using the hopset.

Figure 2:
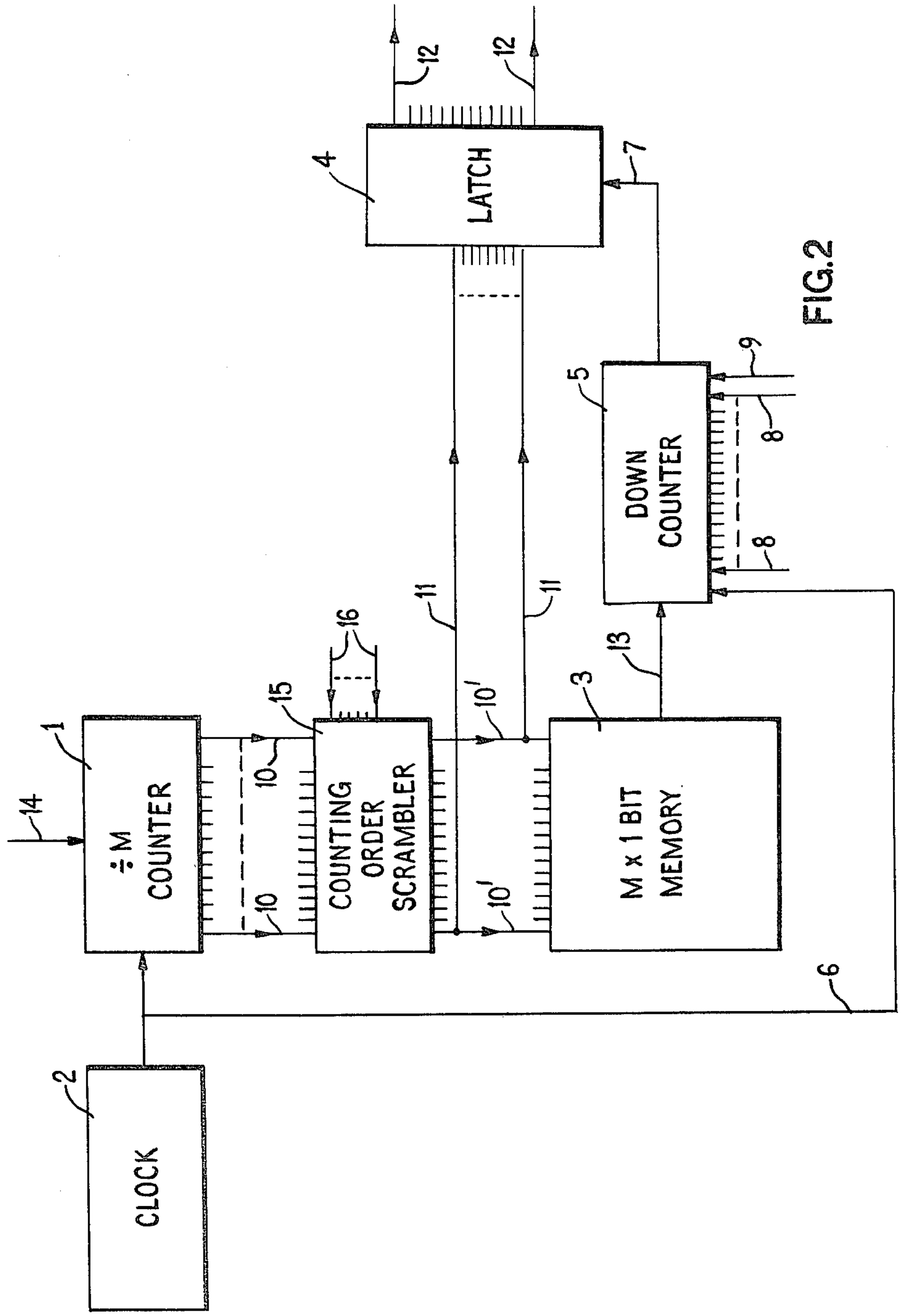

The apparatus of FIG. 2 to which reference is now made is arranged to overcome this simple frequency relationship between networks by scrambling the order of channel addressing. These circuit blocks shown in FIG. 2 which have a similar function to circuit blocks of FIG. 1 are similarly referenced.

In the channel selector of FIG. 2 a counting order scrambler 15 is provided in the lead 10 between the counter 1 and the memory 3 and latch 4. The scrambler 15 causes each of the channel addresses provided on the leads 10' to address the memory 3 and on the leads 11 to the latch 4 to appear in a pseudo-random order. The counter 1 is arranged to count from one to M (where M is the number of channels on which the apparatus is capable of operating) and each number on the leads 10 is represented by a respective number on the leads 10'. The counting order scrambler 15 provides each of the numbers 1—M in pseudo-random order so that each of the addresses in the memory 3 is addressed only once during the count of 1—M by the counter 1. Thus, again assuming the radio sets are capable of operating on 2320 channels if the eight available channels used in the hop set of the preceding example are addressed by the counting order scrambler 15 in the order 1327, 57, 7, 46, 2319, 13, 909, 128 and the pseudo-random number sequence used to set the counter 5 is 7, 5, 8, 1, 4, 3, 6, 2 then radio sets in network A will follow the channel sequence 909, 2319, 128, 1327, 46, 7, 13, 57. The radio sets in network B with an orthogonal offset value of one being added to the pseudo-random number supplied to the counter 5 will follow the sequence 128, 13, 1327, 57, 2319, 46, 909, 7 whilst the radio sets in network C will follow the sequence 1327, 909, 57, 7, 13, 2319, 128, 46. The channel sequence followed by each network may be similarly determined. It will be appreciated that the simple frequency relationship between networks no longer exists and determining the frequency of any particular radio set from any radio set in a different network by observation becomes more difficult.

In order to further scramble the channel selection the counting order scrambler 15 may be arranged to be provided with signals on leads 16 from a further pseudo-random number generator (not shown). The further pseudo-random number signals on the leads 16 may be arranged to cause the counting order scrambler 15 to change the order of scrambling each time the networks change channels.

In order to increase the speed of selection it may be desirable to address the memory 3 in a manner in which, say, eight bits defining channel availability are read at a time as a single byte. The counter 5 may then be arranged to be decremented by a number in the range 0 to 8 in dependance on the number of available channels in the particular byte. The conversion from the eight bit byte to the number of available channels may be effected by, for example, use of a look-up table in a memory (not shown) addressable by the byte value to obtain the number to be decremented by the counter 5.

If a hop set having a large number of channels is used markers may be stored to point, for example, to the 64th, 128th etc. available channels so that an initial jump to within 64 channels may be made by the channel selector.

I claim:

1. Frequency hopping radio communications apparatus having selection circuitry for providing in psuedo-random order a sequence of multi-digit signals identifying n channels selected from N possible channels comprising a first counter responsive to clock signals to provide a series of multi-digit signals identifying each of the N possible channels, electronic latching means the input of which receives the multi-digit signals from said first counter and which is arranged to provide a multi-digit signal at its output corresponding to the multi-digit signal present at its input each time the latching means is enabled, a store which is addressed by said multi-digit signals from said first counter and which is arranged to provide a first signal whenever said multi-digit signals from said first counter identify one of the n channels, and a second counter which is responsive to the first enabling signals to count the clock pulses supplied to said first counter and which is arranged on reaching a predetermined value of the count to provide a second enabling signal to the latching means to latch its output to the multi-digit signal then present at its input.

2. Radio communications apparatus as claimed in claim 1 in which said store is arranged to store a set of N data bits each of which represents a respective one of the N channels, and the respective data bits representing the n channels are set to one binary value and the respective data bits representing the other channels are set to the other binary value.

3. Radio communications apparatus as claimed in claim 1 in which said second counter is responsive to further multi-digit signals to preset a starting value of the count such that the predetermined value of the count at which the second counter provides the second enabling signal to the latching means can be reached after differing numbers of the n channels have been identified by the multi-digit signals from said first counter.

4. Radio communications apparatus as claimed in claim 1 in which said second counter is responsive to further multi-digit signals to set the predetermined value of the count at which the second counter provides the enabling signal to the latching means such that said second enabling signal can be provided after differing numbers of the n channels have been identified by the multi-digit signals from the first counter.

5. Radio communications apparatus as claimed in claim 1 in which a plurality of stores each arranged to store a set of N data bits each of which represents a respective one of the N channels, the respective data bits representing the n channels being set to one binary value and the respective data bits representing the other channels being set to the other binary value, each of the stores having a different combination of respective data bits representing the n channels such that a number of hop sets (as hereinbefore defined) are specified, and the respective store specifying the hop set in use is selected to provide the first enabling signals to said second counter.

6. Radio communications apparatus as claimed in claim 1 in which a counting order scrambler is provided at the output of said first counter such that the series of multi-digit signals which are supplied to the input of the latching means and which are used to address said store is not in a sequential order.

7. Radio communications apparatus as claimed in claim 6 in which said counting order scrambler is responsive to further multi-digit signals to vary the order of scrambling of said multi-digit signal from said first counter.

8. Radio communications apparatus as claimed in claim 1 in which said store is arranged to store a number of sets of N data bits each of said data bits representing a respective one of the N channels, the respective data bits representing the n channels being set to one binary value, the respective data bits representing the other channels being set to the other binary value and each set of N data bits has a different combination of respective data bits representing the n channels such that a number of hop sets (as hereinbefore defined) are specified.

9. Radio communications apparatus as claimed in claim 8 or claim 5 in which each set of N data bits is selected in turn to provide said first enabling signals to the second counter such that the hop set in use is varied from time to time.

* * * * *